United States Patent [19]
Rabow

[11] 3,842,420
[45] Oct. 15, 1974

[54] STEP TRACKING SYSTEM

[75] Inventor: Gerald Rabow, Nutley, N.J.

[73] Assignee: International Telephone and Telegraph Corporation, Nutley, N.J.

[22] Filed: Oct. 13, 1972

[21] Appl. No.: 297,535

[52] U.S. Cl. .............................. 343/117 R, 343/7.4
[51] Int. Cl. .............................................. G01s 3/44
[58] Field of Search ......................... 343/7.4, 117 R

[56] References Cited
UNITED STATES PATENTS

| | | | |
|---|---|---|---|
| 3,419,867 | 12/1968 | Pifer | 343/117 R |
| 3,419,868 | 12/1968 | Clayton, Jr. | 343/117 R |
| 3,530,471 | 9/1970 | Mark | 343/117 R |

Primary Examiner—Maynard R. Wilbur
Assistant Examiner—G. E. Montone
Attorney, Agent, or Firm—John T. O'Halloran; Menotti J. Lombardi, Jr.; Alfred C. Hill

[57] ABSTRACT

This step tracking system is applicable to the angle tracking of any source of energy and includes a pair of stepper motors to mechanically move an antenna, one motor moving the antenna in azimuth and the other motor moving the antenna in elevation. The stepper motors are alternately driven for step scanning by a common source of a pseudo-random step scan waveform having balanced positive and negative excursions. A tracking error control signal is generated from the difference in amplitude of the amplitudes of two adjacent samples of a received waveform. The received waveform is similar to the pseudo-random step scan waveform and one sample is taken in one of adjacent higher and lower intervals of the received waveform while the other sample is taken in the other of the adjacent higher and lower intervals under control of the pseudo-random step scan waveform. A second order servo control system is provided for each of the stepper motors. The servo control system associated with the scanning stepper motor is coupled to respond to the tracking error control signal to cause the scanning stepper motor to take a tracking step to reduce a detected tracking error in the associated one of the aximuthal and elevational motion. A backup programmed tracking control circuit is provided for coupling to the servo control systems to cause the antenna to track the source of energy in place of the tracking error control signal.

10 Claims, 7 Drawing Figures

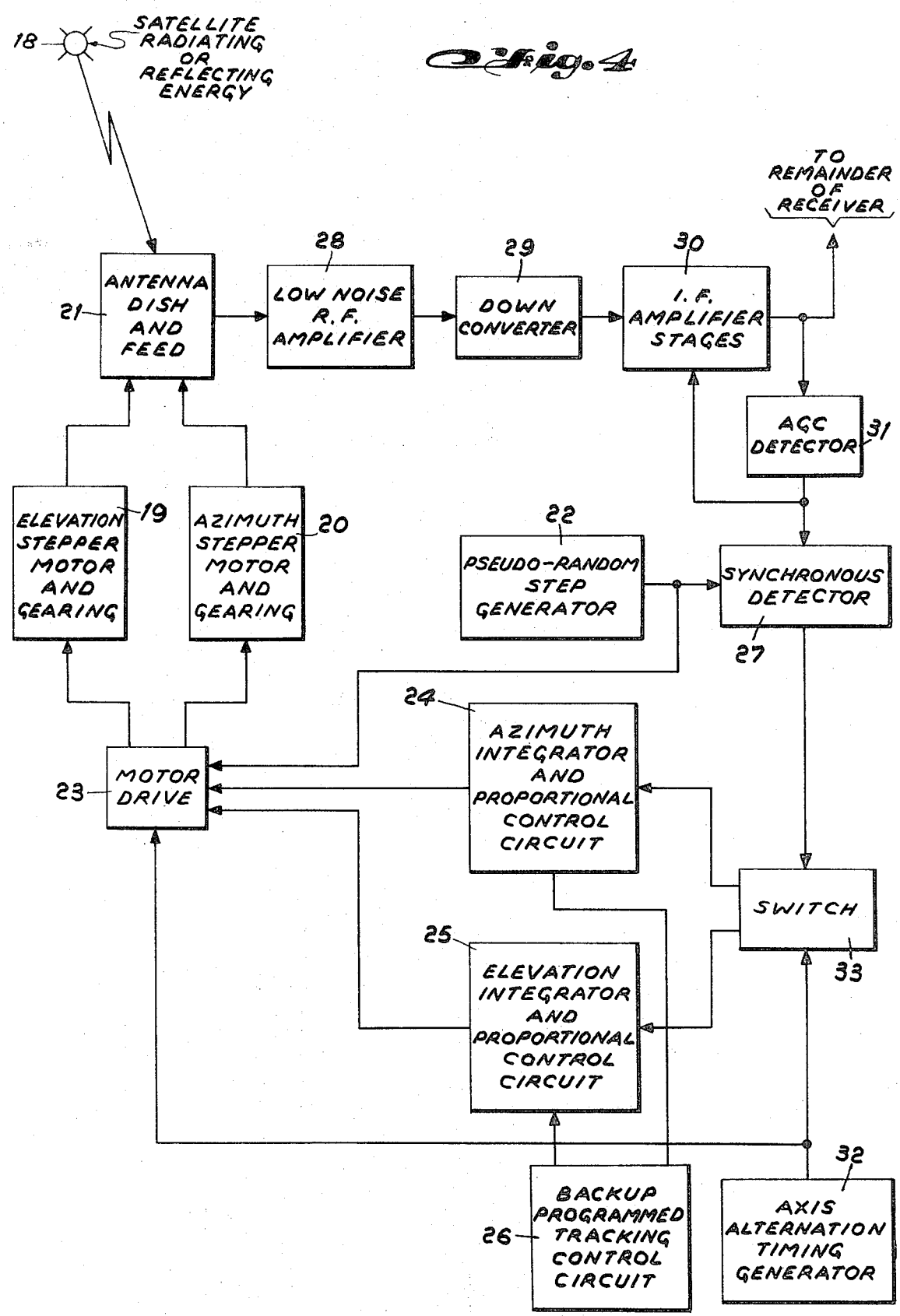

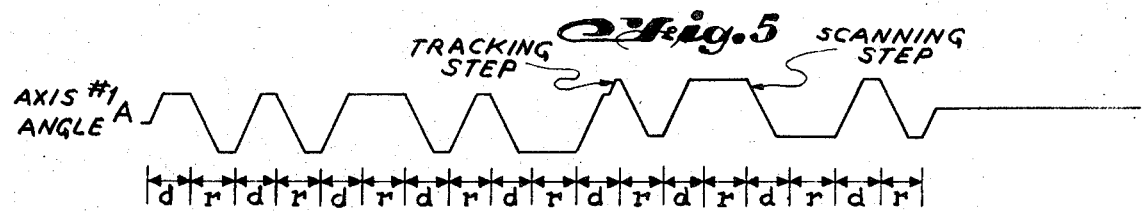
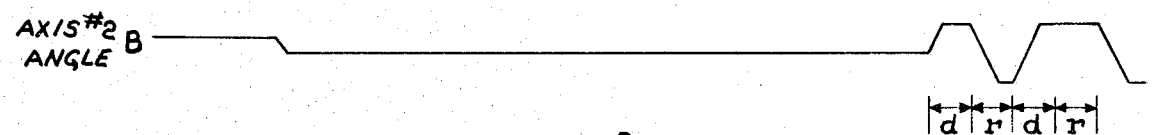
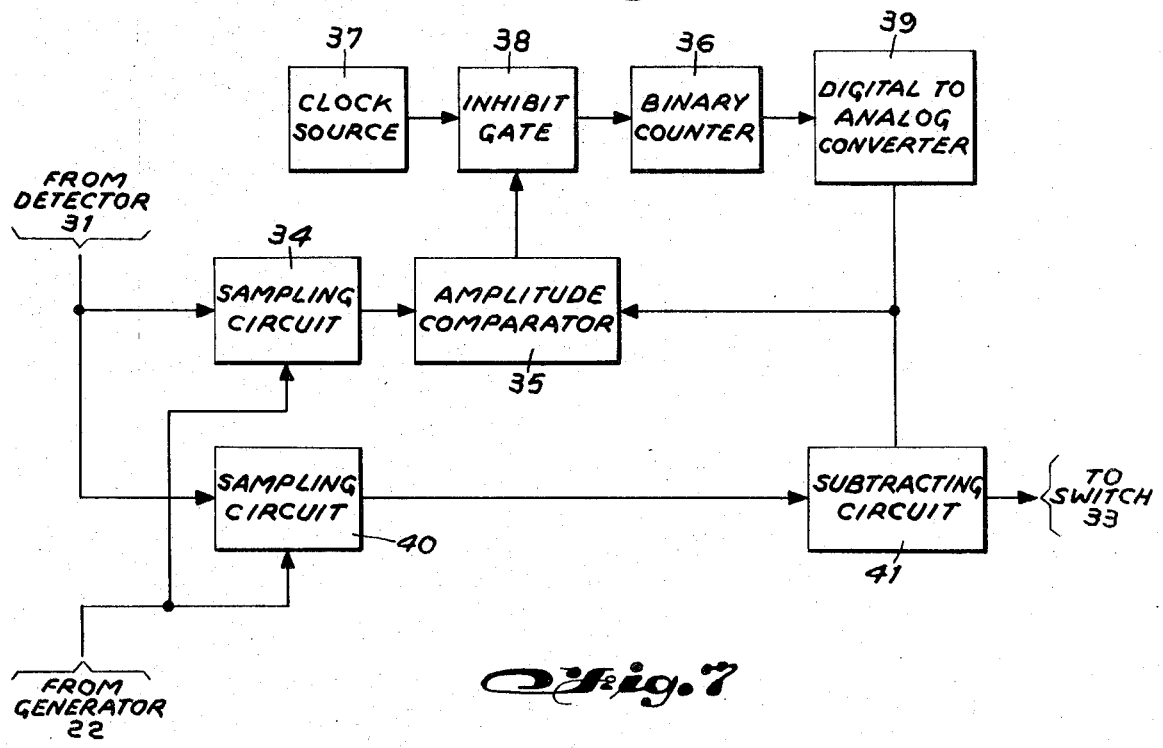
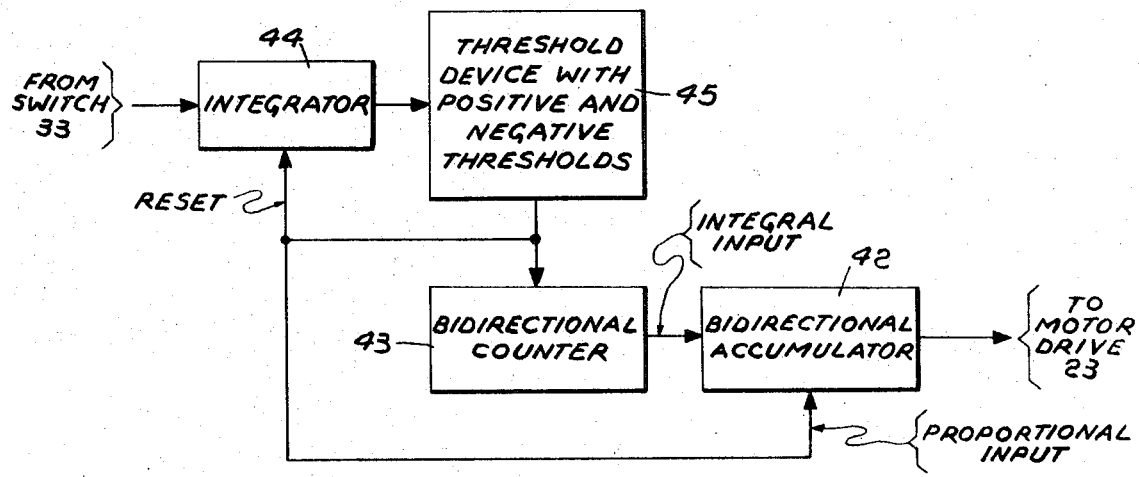

STEP TRACKING SYSTEM

BACKGROUND OF THE INVENTION

This invention relates to tracking systems and more particularly to a step tracking system capable of tracking any source of energy.

A rudimentary step tracking system is known in the prior art and is a mechanization of a few essential manual tracking steps and may be considered a form of "automated" manual tracking. When an operator has visual access to a receive signal level indicator, for example, a S-meter or an AGC (automatic gain control) voltage monitor, the operator can track by stearing the antenna until the receive signal level is maximized to maintain the antenna beam on the energy source. A human operator, when manually tracking a satellite, must first acquire a signal and obtain a receiver lock. After ensuring that the lock is firm the operator moves the antenna in one axis and monitors the AGC level. If the signal level increases, the operator continues to move the antenna in the same direction. If the signal level decreases, the operator reverses the direction and continues to move the antenna back and forth until the signal is maximized.

The operation of the rudimentary step tracking system is quite similar. After signal acquisition, the antenna makes an initial angular move. By comparing the receive signal strength before and after the move, the direction of the next move is decided. FIG. 1 of the drawing illustrates a block diagram of such a rudimentary step tracking system which incorporates a decision circuit which takes the DC (direct current) output from the demodulator AGC monitor. The decision circuit samples, generally with an integrate and dump circuit, holds, and compares the levels of two successive samples, makes the decision and commands the direction of the next move. As illustrated in FIG. 1 the antenna dish and feed 1 is to be controlled to track a source of energy, such as an almost stationary satellite 2 which may radiate directly or reflect energy in the form of radio frequency (RF) signals. The output of antenna 1 is coupled to a receiver having a low noise amplifier 3, a down converter 4 and IF (intermediate frequency) amplifier stages 5. The output of the amplifier stages 5 is coupled to the remainder of the receiver and also to an AGC detector 6 whose output controls the gain of certain of the stages of IF amplifier stages 5. The hereinabove mentioned decision circuit includes sample and hold circuit 7 and sample circuit 8 coupled to the output of detector 6 and an amplifier comparator 9 coupled to the output of circuits 7 and 8. The decision of whether the immediate sample is higher or lower than the previous sample is determined in comparator 9 and is coupled alternately to the azimuth director with storage 10 and the elevation director with storage 11 under control of axis alternation timing generator 12 through means of switch 13. Generator 12 also controls switches 14 and 15 in a manner such that when azimuth motion is desired the azimuth step drive 16 is activated to operate on antenna dish and feed 1 from mechanical motion thereof and in the other position of switches 13, 14 and 15 the elevation director 11 with storage activates elevation step drive 17 independent of azimuth step drive 16 so as to mechanically move the antenna dish and feed 1.

The rudimentary step track system uses probably the simplest maximum-seeking (or "hill-climbing") algorithm which executes the following sequence of events: (1) The signal strength is sampled and remembered at some point in sample and hold circuit 7. (2) The antenna is moved through some finite position increment (a step) and the signal strength is resampled in sample circuit 8. (3) The new signal strength in circuit 8 is compared to the remembered value in circuit 7 by comparator 9. If an increase is observed, the next "step" will be in the same direction as the previous one, otherwise the next step direction is reversed.

A typical motion sequence is shown in FIGS. 2 and 3 which illustrate the order and timing of position movements and the corresponding signal strength variations of the rudimentary step tracking system. The signal variation shown in these diagrams are exaggerated. In actual practice, the signal changes for a nominal step would be less than 0.1 db (decibels). As shown in FIG. 2 and Curve A, FIG. 3, an azimuth step in an arbitrary direction is commanded at point O. At point A the signal strength is measured in circuit 8 and is compared to the stored signal strength value at point O present in circuit 7. Since as illustrated in Curve C, FIG. 3 the signal has decreased, a decision is made to reverse direction of the next azimuth step, and this decision is stored in director 10 while the current value of signal strength is stored in circuit 7. Next, an elevation step is commanded as illustrated in Curve B, FIG. 3 and, after settling, the signal at point B is compared to the stored value of the signal at point A, and a reverse elevation decision is made and stored in director 11. Then the previously stored azimuth step decision is executed. The step-decide procedure is the continuously repeated alternately on azimuth and elevation through points C to H. The operation illustrated in FIGS. 2 and 3 defines the steady state behaviour of a noise-free signal detector. In actual practice, however, the signal strength data will be perturbed by noise. This results in the possibility of making random decision errors, if the signal sampling is done at a time when the instantaneous superimposed noise exceeds the signal increment.

Although the rudimentary step tracking system, as described hereinabove, works when interference is small, it is far from optimum when operating with noisy signals. It will not work properly when the signal it is receiving originates from a similarly stepping tracker, because it cannot distinguish changes in amplitude due to its own step from changes in amplitude of the transmitted signal. Even if the interference is random (it can be forced to be random by making the stepping intervals pseudo-random) the system is sensitive to noise because of the following shortcomings:

1. The system makes use only of whether the present signal is greater or smaller than the previous signal, thus disregarding information on the amount by which the two signals differ.

2. Tracking systems normally employ velocity memory in order to smooth out the effects of noise. The rudimentary step tracking system hereinabove described lacks such a memory.

3. The tracking steps are the same size as the scanning steps, thus causing larger than necessary error. In a more accurate system, the tracking position, for instance, the average position about which scanning is accomplished, should be controlled much more finely.

SUMMARY OF THE INVENTION

An object of the present invention is to provide a step tracking system which overcomes the aforementioned difficulties of the rudimentary step tracking system.

Another object of the present invention is to provide a step tracking system which employs the difference between two adjacent samples of the received signals to generate the tracking error control signal.

Still another object of the present invention is to provide a second order servo control system for each axis of motion, azimuth and elevation motion, thereby providing velocity memory for the tracking system of the present invention.

A further object of the present invention is to provide a step tracking system wherein the tracking step is more finely controlled than the scanning step.

Still a further object of the present invention is to provide a pseudorandom step scan waveform with balanced positive and negative excursions.

Another object of the present invention is to provide in place of the tracking error control signal a backup programmed tracking control system which requires no signal input and which cam generate any desired piece like parabolic function taking advantage of the double integration available in each of the servo control systems.

A feature of the present invention is the provision of a step tracking system to track a source of energy comprising: first means coupled to the antenna capable of mechanically moving the antenna independently in azimuth and in elevation; second means to generate a pseudo-random step waveform; third means coupled to the antenna to detect the amplitude of the energy received by the antenna; fourth means coupled to the second means and the third means responsive to the pseudo-random step waveform and the amplitude of the received energy to produce a tracking error control signal; fifth means capable of being coupled to the first means and the fourth means and capable of responding to the tracking error control signal to produce a first tracking drive signal which is capable of driving the first means to reduce tracking error in azimuth; sixth means capable of being coupled to the first means and the fourth means and capable of responding to the tracking error control signal to produce a second tracking drive signal which is capable of driving the first means to reduce tracking error in elevation; and seventh means to simultaneously couple the fourth means to the fifth means to enable the fifth means to produce the first tracking drive signal, couple the second means to the first means to step scan the antenna in azimuth in response to the pseudo-random step waveform, and couple the fifth means to the first means to couple the first tracking drive signal to the first means during first given spaced time intervals and to simultaneously couple the fourth means to the sixth means to enable the sixth means to produce the second tracking drive signal, couple the second means to the first means to step scan the antenna in elevation in response to the pseudo-random step waveform, and couple the sixth means to the first means to couple the second tracking drive signal to the first means during second given spaced time intervals.

BRIEF DESCRIPTION OF THE DRAWING

Above-mentioned and other features and objects of this invention will become more apparent by reference to the following description taken in conjunction with the accompanying drawing, in which:

FIG. 4 is a block diagram of a step tracking system in accordance with the principles of the present invention;

FIG. 5 is a set of curves illustrating the operation of the step tracking system of FIG. 4;

FIG. 6 is a block diagram of one embodiment of the synchronous detector of FIG. 4; and FIG. 7 is a block diagram of one embodiment of the integrator and proportional control circuit employed in each of the servo control systems of FIG. 4.

DESCRIPTION OF THE PREFERRED EMBODIMENT

Figure 1:
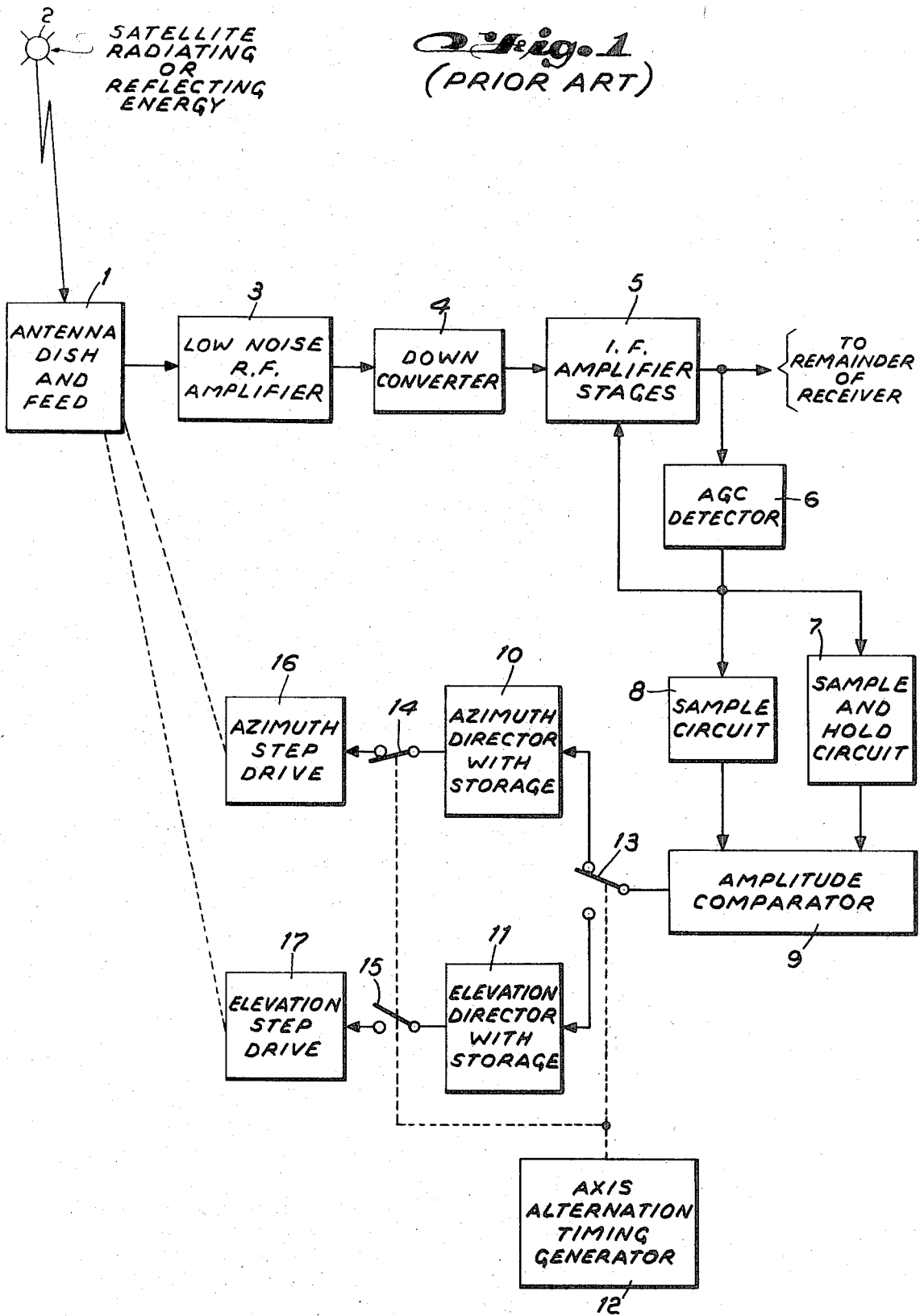
FIG. 1 is a block diagram of a rudimentary step tracking system as employed in the prior art.
Figure 3:
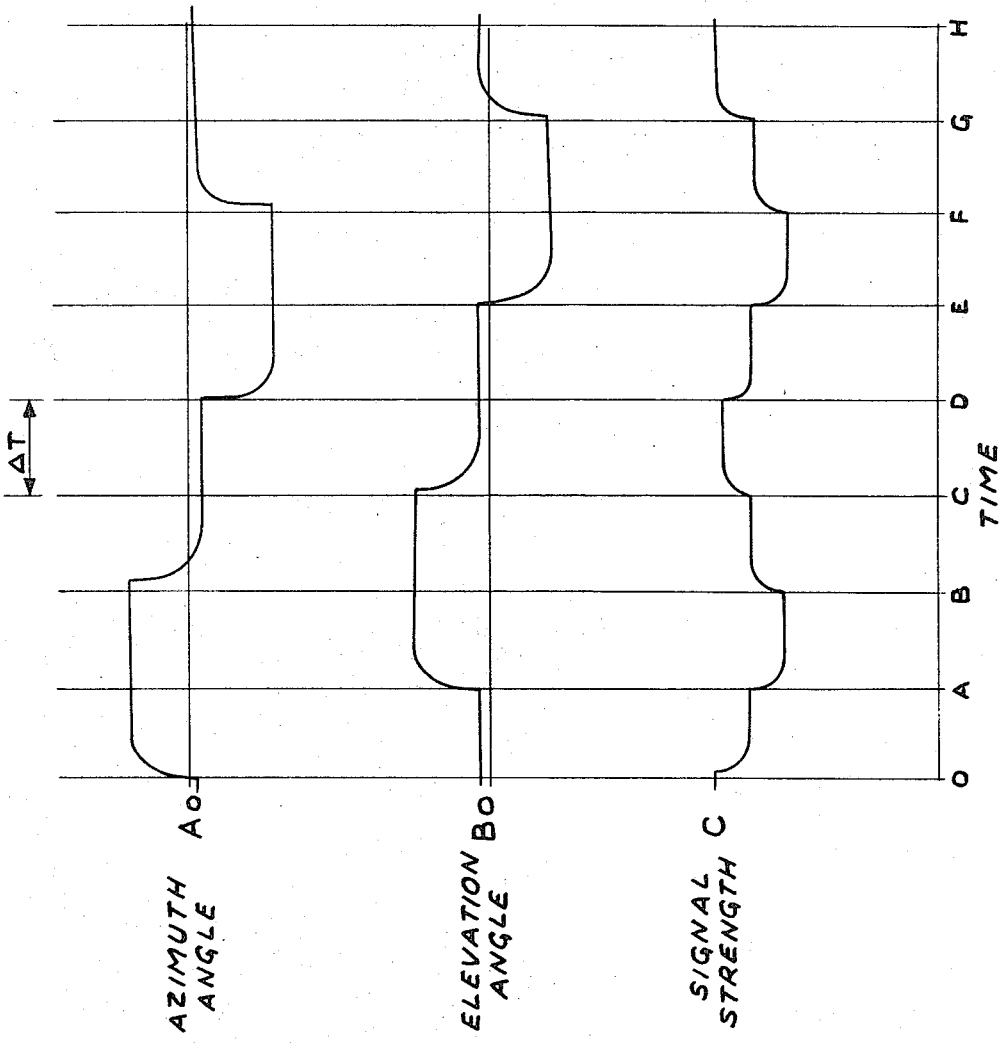
FIGS. 2 and 3 are waveforms illustrating the operation of the rudimentary step tracking arrangement of FIG. 1.
Figure 2:
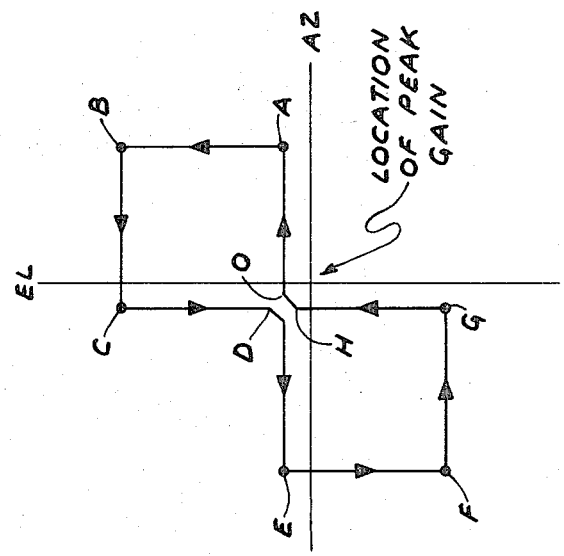

The description that follows directed toward the step tracking system of the present invention is applicable to the angle tracking of any source of energy, such as RF signals, light and sound, regardless of whether the energy is directly radiated from or is reflected from a device carrying the source of energy, such as an almost stationary satellite. Thus, the step tracking system of the present invention will work with different sources and the source employed in the following description is that of an RF signal radiated or reflected from satellite 18 which is almost stationary. As mentioned above, the source of energy may also be light or sound and the only change necessary will be that of making sure that the antenna and receiver are compatible with the type of energy involved.

The step tracking system illustrated in block diagram form in FIG. 4 overcomes the difficulties mentioned hereinabove with respect to the rudimentary step tracking system by separating the scanning functions and the tracking functions, thereby allowing the application of available servo techniques to achieving good tracking performance in the presence of noise, and allowing scanning with a pseudo-random waveshape which optimally measures tracking error.

Scanning consists of antenna dish motion other than that required to point the antenna at the signal source, in order to obtain information on pointing error. Tracking consists of positioning the antenna to best point at the signal source; that is, to minimize some desired function of pointing error, such as RMS (root means square) pointing error or three sigma pointing error, taking into account that the scanning contributes to the pointing error.

The description below of FIG. 4 is one embodiment of the step tracking system in accordance with the principles of the resent invention and includes the following features. (1) Stepper motors and gearing 19 and 20 for antenna dish and feed 21 are driven alternately. (2) A pseudo-random step scanning waveform with balanced positive and negative excursions is generated in pseudo-random step generator 22 and its output is coupled to motor drive 23 to scan the antenna dish and feed 21 alternately in azimuth and in elevation. (3) The azimuth integrator and proportional control circuit 24 and the elevation integrator and proportional control circuit 25 are second order servo controlled systems which have velocity memory. (4) A passive backup programmed tracking control circuit 26 (not signal required) is employed in place of the absence of a tracking error control signal from synchronous detector 27 to generate any desired piecewise parabolic function having its output connected to circuits 24 and 25, taking advantage of the double integration available in these circuits.

The antenna dish and feed 21 is driven mechanically in either axis (azimuth or elevation) by stepper motor and gearing 19 and stepper motor and gearing 20 alternately. The signal received by antenna 21 is amplified in the receiver including low noise RF amplifier 28, a down convertor 29 and IF amplifier stages 30. Amplifier stages 30 supplies an output signal to the remainder of the receiver which is to be utilized for the basic function of the system of which this invention is a part. The invention does not utilize the output from amplifier stages 30, but uses an auxiliary output coupled from the output of the AGC detector 31 to synchronous detector 27. The output from detector 31 is a measure of signal strength into the receiver. The AGC circuit must be sufficiently fast to follow the changes in signal level. This can be easily accomplished because the signal level changes are caused by mechanical motion of the antenna dish 21 and, hence, relatively slow. It is also desirable to have the AGC voltage approximately proportional to the logarithm of the signal strength. Conventional AGC devices usually behave in this manner.

The further description of FIG. 4 is made with reference to the waveforms of FIG. 5 which are illustrative waveforms of motion in the two tracking axes. It should be noted that at any one time, there is motion in only one axis. The waveforms are a composite of three separate waveforms, namely, a scanning waveform, a tracking step and axis alternation. The scanning waveform is divided into equal $d$ (for determining) and $r$ (for random) periods. During the $d$ period, the antenna always makes a step. During the $r$ period, the antenna makes a step or makes no step pseudo-randomly with equal probability. Scan stepping is always between two levels on either side of mid position so that there is never any doubt about the direction of a step, given that the step is to be made. The scanning waveform has the features that the time spent in the up and down positions are equal, yet at any time up or down positions are equally probable and uncorrelated with the scanning position one $dr$ interval or more previously. The former feature simplifies obtaining an error signal and makes its amplitude independent of pseudo-random decisions. The latter feature protects the tracking system against interference including deliberate jamming. When a tracking step is required, it is taken during the rest period of the scanning waveform. The tracking motion is generally much less than the scanning motion, but this is not an inherent limitation of the present invention. Axis alternation timing generator 32 through switch 33 and a switching arrangement in motor drive 23 selects the axis to be scanned. Note that the inactive axis is returned to mid position between scan extremities.

The signal level output of detector 31 has a waveshape similar to that of Curve A, FIG. 5 for the active axis, but with a DC offset and with a magnitude and sense which is proportional to the tracking error in that axis of motion. Synchronous detector 27 detects this tracking error and produces an output signal called a tracking error control signal whose magnitude and sense are proportional to the tracking error. This can be done by multiplying the signal level output of detector 31 by the scanning waveform from generator 22. It is usually more convenient to sample the output signal from detector 31 during, say, the high interval, sample again during a low interval and take the difference of these two samples as a measure of the desired error value. This implies a sample and hold device, which can hold the sample of the output signal of detector 31 until the next sample time. When the hold time is long, as it would be for a slowly scanning dish, it is probably most convenient to implement the hold by means of a binary counter and digital to analog converter.

Such a system is shown in FIG. 6 as an example thereof. The output from detector 31 is sampled in sampling circuit 34 under control of the step scan waveform generator 22. The output signal of circuit 34 comprises one input of amplitude comparator 35. Binary counter 36 is incremented by the output signal from clock source 37 coupled to counter 36 through an inhibit arrangement, such as INHIBIT gate 38. The rate of the output pulses from the source 37 is such that counter 36 is rapidly incremented relative to the scan. This incrementing of counter 36 continues until digital-to-analog converter 39 produces an analog output signal equal to the amplitude of the sample of circuit 34. The output signal from converter 39 constitutes the second input to comparator 35. At this time comparator 35 produces an output which is applied to gate 38 to inhibit further incrementing of counter 36. This value of count of counter 37 is held until the next adjacent sampling time. The next sample will be taken in sampling circuit 40 again under control of generator 22 and also in sampling circuit 34 in preparation for the next decision. For the present decision the output from sampling circuit 40 and the analog output from converter 39 are subtracted in subtracting circuit 41. As mentioned above the sampling times are supplied by pseudo-random step generator 22. For example, the beginning of the hold period could be a fixed time after the scanning "up" step (adjusted to assure always coming before, but not much before, the most immediate "down" step) and the subtraction sampling time could be the same fixed time after the "down" step. A number of other choices for implementing synchronous detector 27 exist, and the selection of a particular implementation in a given application depends on the parameters of the particular situation, such as noise level, scan speed, types of the other interference, tracking dynamics, relative importance of cost and performance and the like.

The active axis of motion for antenna 21 is selected by timing generator 32. Switch 33 under control of generator 32 and a switch arrangement in motor drive 23 permits the activation of one motion axis. Switch 33 channels the tracking error signal from synchronous detector 27 into azimuth integrator and proportional control circuit 24 or elevation integrator and proportional control circuit 25 depending on which axis is active. Since these networks have memory, a separate network dedicated to each axis is required. Motor drive 23 drives the appropriate motor 19 or 20 by the number of steps indicated by the signals from generator 22 and from circuit 24 or circuit 25.

When step generator 22 indicates a scan motion, the scan motion is applied to stepper motor and gearing 19 or 20 according to the active channel as dictated by generator 32. During the dwell time of the scan cycle, the output signals of control circuits 24 and 25 are examined periodically and a tracking step taken in the appropriate axis, for instance, motor 19 for control circuit 25 and motor 20 for control circuit 24. In the backup programmed control mode, the error signal from detector 27 is not utilized, but a constant signal of appropriate magnitude, polarity and duration is applied to each of the control circuits 24 and 25 from circuit 26.

One possible and convenient form of the input signal to motor drive 23 is a train of pulses with the number of steps of constant size and the motor is to be driven proportional to the number of pulses. In this case, a change of state of pseudo-random step generator 22 triggers the desired number of pulses. Drive logic is used to cause the motor to drive in the desired direction. Integrator and proportional control circuits 24 and 25 can then each take the form of a bidirectional accumulator and a bidirectional counter as illustrated in FIG. 7. Whenever the accumulator overflows, the corresponding motor is driven in the appropriate direction. Bidirectional accumulator 42 receives its integral input periodically from bidirectional counter 43. Counter 43 receives its input, and the accumulator 42 receives its proportional input, from the error output of synchronous detector 27. If the output from synchronous detector 27 is in analog form, a convenient means of converting it to digital form is by means of an integrator 44 and a threshold device 45 having positive and negative thresholds. Whenever the positive or negative threshold is reached, integrator 44 is reset, counter 43 is incremented and accumulator 42 receives a proportional input.

The scanning waveform generated by generator 22 can be obtained from the combination of a constant rate generator coupled with a pseudo-random state device, which can inhibit the scan trigger in one of its states. The pseudo-random state device can be a shift register with linear feedback logic.

While I have described above the principles of my invention in connection with specific apparatus it is to be clearly understood that this description is made only by way of example and not as a limitation to the scope of my invention as set forth in the objects thereof and in the accompanying claims.

I claim:

1. A step racking system to track a source of energy comprising:
    an antenna;
    first means coupled to said antenna capable of mechanically moving said antenna independently in azimuth and in elevation;
    second means to generate a single pseudo-random step waveform;
    third means coupled to said antenna to detect the amplitude of said energy received by said antenna;

fourth means coupled to said second means and said third means responsive to said pseudo-random step waveform and said amplitude and said received energy to produce a single tracking error control signal;

fifth means capable of being coupled to said first means and said fourth means and capable of responding to said tracking error control signal to produce a first tracking drive signal which is capable of driving said first means to reduce tracking error in azimuth;
    sixth means capable of being coupled to said first means and said fourth means and capable of responding to said tracking error control signal to produce a second tracking drive signal which is capable of driving said first means to reduce tracking error in elevation; and
    seventh means operative during first given spaced time intervals to couple said fourth means to said fifth means to enable said fifth means to produce said first tracking drive signal, to couple said second means to said first means to step scan said antenna in azimuth in response to said pseudo-random step waveform during first spaced portions of said first time intervals, and to couple said fifth means to said first means to couple said first tracking drive signal to said first means during second spaced portions of said first time intervals different than said first portions of said first time intervals and operative during second given spaced time intervals different than said first time intervals to couple said fourth means to said sixth means to enable said sixth means to produce said second tracking drive signal, to couple said second means to said first means to step scan said antenna in elevation in response to said pseudo-random step waveform during first spaced portions of said second time intervals, and to couple said sixth means to said first means to couple said second tracking drive signal to said first means during second spaced portions of said second time intervals different than said first portions of said second time intervals.

2. A system according to claim 1, wherein said pseudo-random step waveform includes
    a plurality of randomly disposed steps having balanced positive and negative excursions.

3. A system according to claim 1, wherein said first means includes
    a first stepper motor to mechanically move said antenna in either direction in azimuth, and
    a second stepper motor to mechanically move said antenna in either direction in elevation.

4. A system according to claim 1, wherein said third means includes
    an automatic gain control detector incorporated in a receiver coupled to said antenna.

5. A system according to claim 1, wherein said fourth means includes
    a synchronous detector responding to said amplitude of said received energy and said pseudo-random step waveform.

6. A system according to claim 1, wherein said fifth and sixth means each include
    a second order servo control system.

7. A system according to claim 1, wherein said third means provides an output signal having a waveform substantially the same as said pseudo-random step waveform but having a direct current offset with respect thereto proportional to the magnitude and sense of a tracking error, and said fourth means produces said tracking error control signal by determining the amplitude difference between two adjacent samples of said output signal, one of said two adjacent samples being taken during a high interval of said output signal and the other of said two adjacent samples being taken during an adjacent low interval of said output signal.

8. A system according to claim 7, wherein
said fourth means includes
  a binary counter incremented at a rate greater than a scan rate,
  a digital to analog converter to produce an analog output signal equal to the count of said counter,
  a first sampling circuit coupled to said third means and said second means to sample said output signal during one of said high and low intervals under control of said pseudo-random step waveform,
  eighth means coupled to said counter, said converter and said first sampling circuit to inhibit incrementing said counter when the amplitude of said analog output signal equals the amplitude of the sample at the output of said first sampling circuit,
  a second sampling circuit coupled to said third means and said second means to sample said output signal during the other of said high and low intervals under control of said pseudo-random step waveform, and
  a subtracting circuit coupled to said converter and said second sampling circuit to subtract the output signals therefrom to produce said tracking error control signal.

9. A system according to claim 1, wherein
said fifth and sixth means each include
  an integrator coupled to said fourth means by said seventh means,
  a threshold device having positive and negative threshold levels coupled to the output of said integrator, said threshold device providing an output signal each time either of said positive and negative threshold levels are exceeded, said output signal being coupled to said integrator to reset said integrator,
  a bidirectional counter coupled to said threshold device responsive to said output signal therefrom, and
  a bidirectional accumulator having an integral input coupled to the output of said counter, a proportional input coupled to said threshold device responsive to said output signal therefrom and an output to provide the associated one of said first and second tracking drive signals.

10. A system according to claim 1, further including a backup programmed tracking control circuit capable of being coupled to both said fifth and sixth means in place of said tracking error control signal.

* * * * *